United States Patent
Smereka et al.

(10) Patent No.: US 9,883,017 B2
(45) Date of Patent: Jan. 30, 2018

(54) CATEGORIZED HANDLING OF ELECTRONIC COMMUNICATIONS

(71) Applicant: Myine Electronics, Inc., Ferndale, MI (US)

(72) Inventors: Scott Smereka, Warren, MI (US); Joey Ray Grover, Madison Heights, MI (US)

(73) Assignee: Livio, Inc., Royal Oak, MI (US)

( * ) Notice: Subject to any disclaimer, the term of this patent is extended or adjusted under 35 U.S.C. 154(b) by 137 days.

(21) Appl. No.: 14/261,911

(22) Filed: Apr. 25, 2014

(65) Prior Publication Data

US 2015/0312392 A1 Oct. 29, 2015

(51) Int. Cl.
*H04M 3/42* (2006.01)
*H04M 1/60* (2006.01)
*H04M 1/725* (2006.01)
*H04M 19/04* (2006.01)
*H04M 1/253* (2006.01)

(52) U.S. Cl.
CPC ..... *H04M 1/6091* (2013.01); *H04M 1/72519* (2013.01); *H04M 1/72569* (2013.01); *H04M 3/42042* (2013.01); *H04M 19/04* (2013.01); *H04M 1/2535* (2013.01); *H04M 3/42059* (2013.01)

(58) Field of Classification Search
CPC .......................... H04M 3/42059; H04M 19/04
USPC ....................................................... 455/415
See application file for complete search history.

(56) References Cited

U.S. PATENT DOCUMENTS

| 6,014,556 | A | 1/2000 | Bhatia et al. | |
|---|---|---|---|---|
| 8,406,408 | B2 | 3/2013 | Matsumura et al. | |
| 8,577,350 | B2 | 11/2013 | Vance et al. | |
| 2003/0103482 | A1* | 6/2003 | Van Bosch | H04L 29/06 370/338 |
| 2006/0062365 | A1* | 3/2006 | Yeh | H04M 15/06 379/142.1 |
| 2007/0178878 | A1* | 8/2007 | Ding | H04W 76/002 455/403 |
| 2007/0211873 | A1* | 9/2007 | Wang | H04M 3/42042 379/142.01 |
| 2008/0076395 | A1* | 3/2008 | Bhatia | H04M 3/42365 455/413 |
| 2008/0219435 | A1* | 9/2008 | Kodama | H04L 9/3242 380/28 |
| 2009/0150507 | A1 | 6/2009 | Davis et al. | |
| 2009/0239497 | A1* | 9/2009 | Sennett | H04W 76/007 455/404.1 |
| 2010/0061297 | A1* | 3/2010 | Wei | H04J 11/0069 370/328 |

* cited by examiner

*Primary Examiner* — Keith Fang
(74) *Attorney, Agent, or Firm* — Jennifer M. Stec; Brooks Kushman P.C.

(57) ABSTRACT

A recipient communications device associated with a vehicle computing system (VCS) may be configured to receive, over a communications network, an incoming communication from a sender communications device, identify a notification type to provide based on a message directive provided by the sender device, retrieve notification settings associated with the notification type, and perform a notification of receipt of the incoming communication using a VCS user interface according to the notification settings.

17 Claims, 6 Drawing Sheets

CATEGORIZED HANDLING OF ELECTRONIC COMMUNICATIONS

TECHNICAL FIELD

This disclosure generally relates to the categorized handling of electronic communications.

BACKGROUND

Mobile phones may allow users to associate different ring tones with different contacts or groups of contacts. Mobile phones may also allow users to automatically block or ignore contacts or groups of contacts. In some cases, ignoring contacts may be scheduled as being enabled or disabled according to time, user input or device location. However, configuring these contact or group-specific settings may be tedious and likely to become out-of-date, and the block or ignore settings may relate only to contacts stored on and known to the mobile phone. Moreover, blocked contacts may attempt to overcome the block or ignore settings by performing actions such as performing multiple calls in a row.

SUMMARY

In a first illustrative embodiment, a system includes recipient communications device associated with a vehicle computing system (VCS) and configured to receive, over a communications network, an incoming communication from a sender communications device, identify a notification type to provide based on a message directive provided by the sender device, retrieve notification settings associated with the notification type, and perform a notification of receipt of the incoming communication using a VCS user interface according to the notification settings.

In a second illustrative embodiment, a method includes receiving, by a recipient communications device over a communications network, an incoming communication from a sender communications device; identifying, by the recipient communications device, a notification type to provide based on a message directive provided by the sender device; retrieving notification settings associated with the notification type; and performing a notification of receipt of the incoming communication in accordance with the notification settings.

In a third illustrative embodiment, a non-transitory computer-readable medium including instructions that when executed by a recipient communications device cause the recipient communications device to receive, over a communications network, an incoming communication from a sender communications device; identify a notification type to provide based on a message directive provided by the sender device; retrieve notification settings associated with the notification type; and perform a notification of receipt of the incoming communication in accordance with the notification settings.

DETAILED DESCRIPTION

Figure 1:
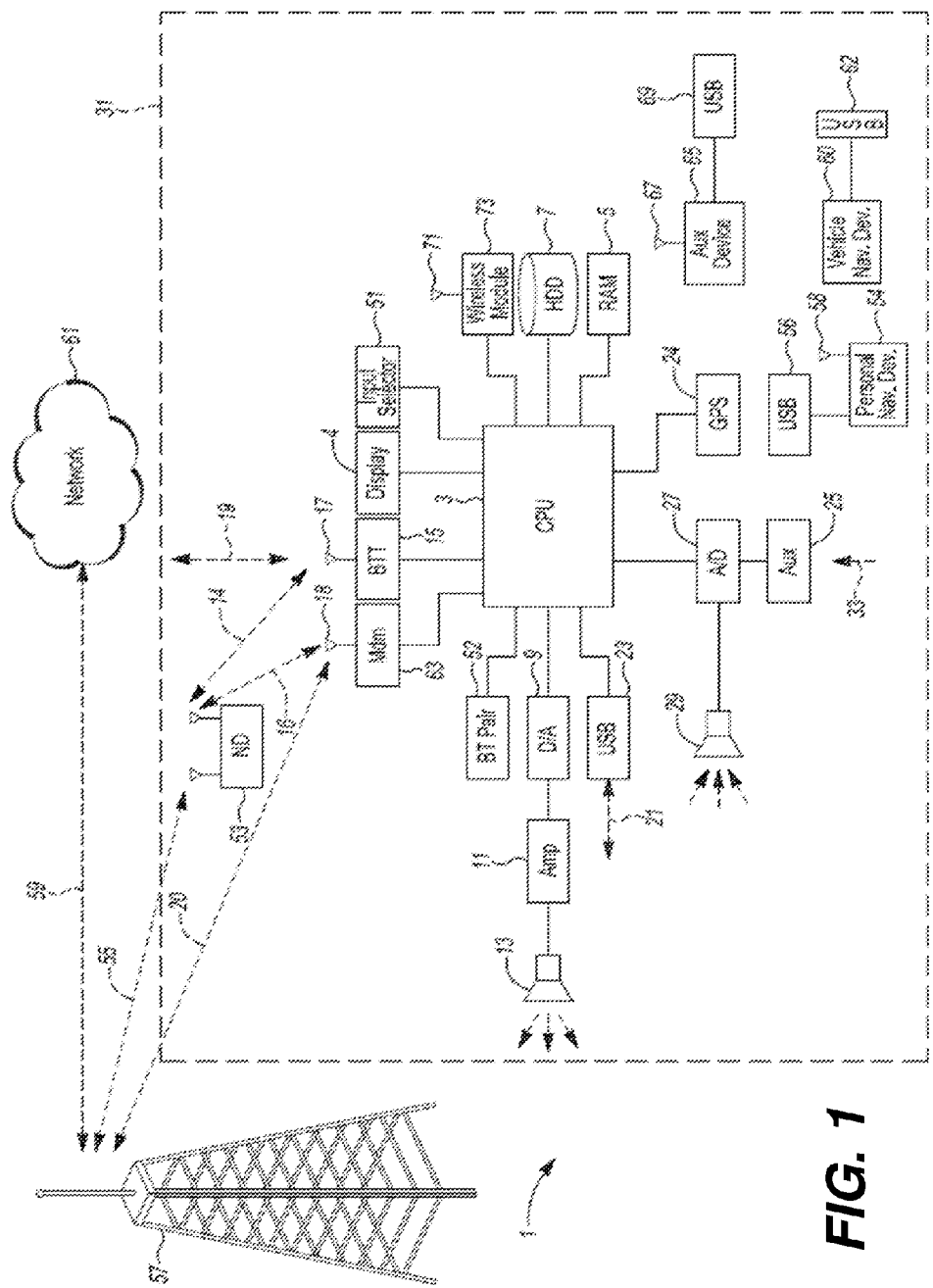
FIG. 1 is an exemplary block topology of a vehicle infotainment system implementing a user-interactive vehicle based computing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may be configured to allow a sender of an incoming communication request, such as a phone call or text message, to associate a type or category with the request. The type or category may then be used by the recipient of the request to determine, based on recipient preferences, how to handle notification of the user of the communication request. Thus, by comparing the assigned type of communication with the recipient preferences for that type, the recipient may be able to perform appropriate notification actions when the communication request occurs.

For example, Bob may wish to make an emergency call to John, but John may have his mobile phone ringer set to silent. Nevertheless, when John's mobile phone receives an incoming call associated with the emergency type, John's phone may identify, based on its maintained notification settings for emergency type calls, to increase the ring volume and play a special ring tone assigned to emergency calls.

In order for the recipient device to determine which notification settings to use (e.g., John's phone in the above example), the recipient communications device may be required to receive the type or category of the incoming communication request. This type or category of communication request may be assigned by the sender communications device and provided to the recipient communications device in various ways.

As one possibility, the communication request may be modified to include a category or type field into the negotiation, header, or body of the communication request. For instance, for an IP based communication (such as a voice over Internet protocol (VoIP) communication set up using session initiation protocol (SIP)), a category may be sent or otherwise included in a packet or other payload sent from the sender communications device to the recipient communications device after an initial handshake. For a non-IP based incoming communication, the category may be sent, for example, after the initial handshake as a part of call setup via integrated services for digital network (ISDN) user part (ISUP) signaling system 7 (SS7) signaling.

As another possibility, a server intermediary to the communication request may be utilized to provide the category or type information to the recipient. After a user or system has selected the type or category of communication, but before the communication takes place, the sender communications device may performs a POST type of request to the server describing who is making the call, the category of the communication or other call-specific information, and an address/phone number or other indication of the intended recipient communications device. When the recipient communications device receives the communication, the recipient communications device may perform a GET type of request to the server, which may cause the server to return to the recipient communications device the posted category and other information about the incoming communication. If the GET request returns no data or cannot be made, an undefined category may be assigned to the incoming communication request.

As yet another possibility, a pre-communication message may be utilized to provide the category or type information from the sender to the recipient. For example, when a sender communications device attempts to send a communication to a recipient communications device, the sender communications device may first send a pre-communications message (such as a short message service (SMS)) containing the sender information, a category or type, and a current date/time to the recipient. The recipient communications device may receive the pre-communication message, and wait for a delivery confirmation from the recipient communications device. Once the sender communications device sends the incoming communication request, the recipient communications device may identify the source according to the pre-communications message and label it appropriately.

Once the communication has been identified as being associated with a type or category, the receiving system may be configured to retrieve settings of the recipient device to notify the recipient according to user-defined preferences, or otherwise take pre-defined actions. Accordingly, the system may provide the user with a refined mechanism for control of how the recipient would like to be notified of incoming communication requests.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
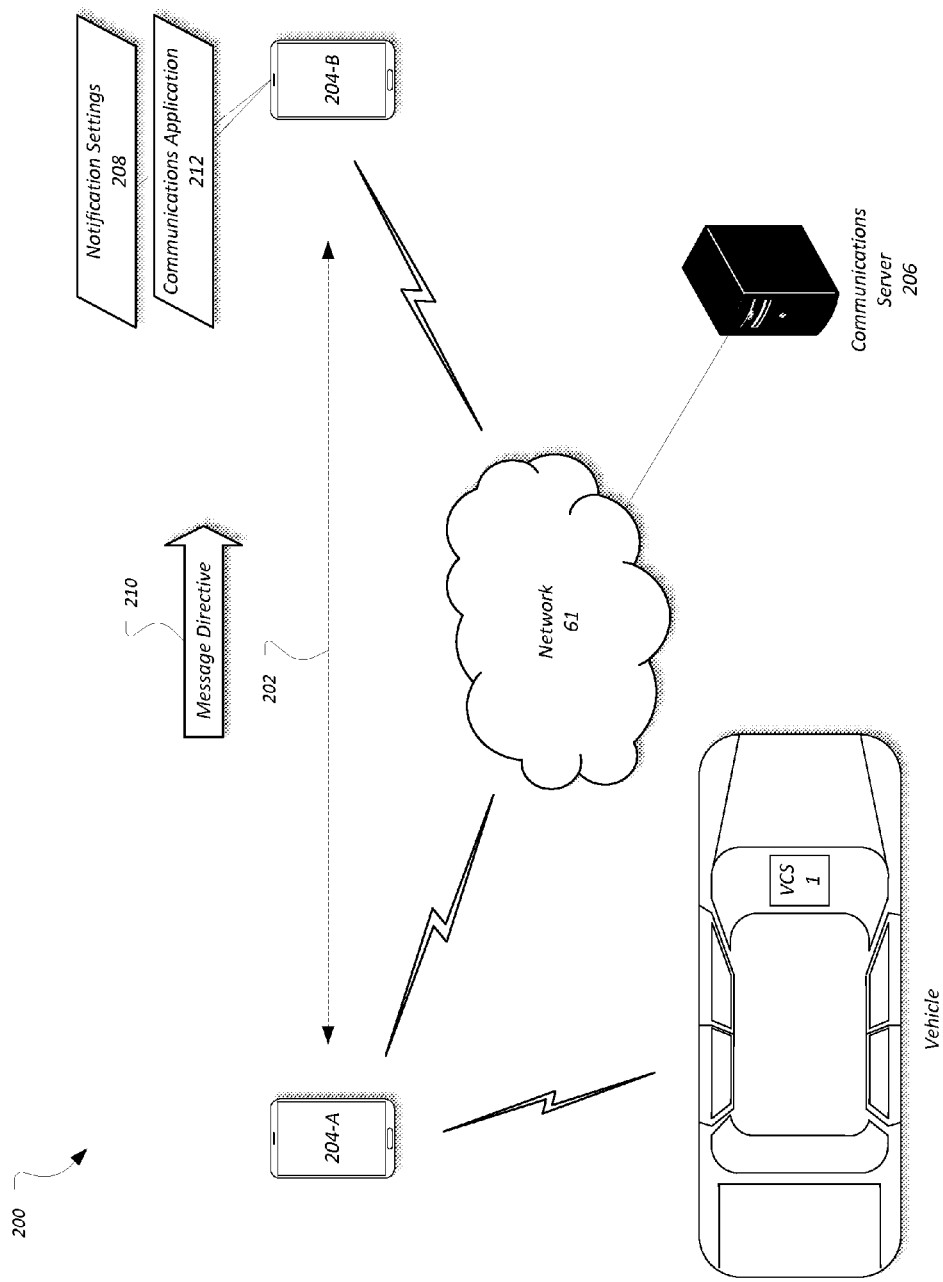
FIG. 2 illustrates an exemplary vehicle configured to receive communication request and in communication with a remote communication device via the network.

FIG. 2 illustrates an exemplary system 200 for providing categorized handling of communications requests 202. The system 200 includes a plurality of communications devices 204-A and 204-B (collectively 204) configured to provide communications 204 over the communications network 61. The system 200 may further include a communications server 206 configured to facilitate the setup of communications 202 between the communications devices 204. The communications devices 204 may be configured to notify their associated users of incoming communications according to notification settings 208 maintained by the communications devices 204, and received message directive information 210 specifying which notification settings 208 to apply. The system 200 may take many different forms and include multiple and/or alternate components and facilities. While an exemplary system 200 is shown in FIG. 2, the exemplary components illustrated in the Figure are not intended to be limiting. Indeed, additional or alternative components and/or implementations may be used. As an example, while two communications device 204-A and 204-B and one communications server 206 are shown in the system 200, the communications system 200 may have more or fewer communications device 204 and/or third-party communications servers 206.

The system 200 may be configured to facilitate the transmission of communications 202 between users of the system 200. In some cases, the communications 202 may be message-based and delivered as individual units (such as SMS messages, instant messages, or multimedia messages. In other cases, the communications 202 may be session-based, and may require the concurrent allocation of sender and recipient resources over a period of time (such as phone call or video conferences).

A communications device 204 is a type of network resource that may serve as a logical network end-point to create, send and/or receive the communications 202. Exemplary communications devices 204 may include public switched telephone network (PSTN), telephones, VoIP telephones, cellular telephones, mobile devices, laptop computers, personal digital assistants, portable music players, tablet devices, and even the VCS 1 itself. In some instances, a communications server 206 may set up and manage a communications session 202 such as a telephone call between two or more communications device 204 (e.g., a voice over IP call server, a plain old telephone system call control element, an SMS message gateway, etc.). In other instances, two communications device 204 may set up and manage a communication session 202 between one another without requiring an intermediate communications server 206.

The communications network 61 may include wired (e.g., fiber and copper) and wireless mechanisms that incorporate related infrastructure and accompanying network elements. Illustrative communication networks include the PSTN, a voice over Internet Protocol (VoIP) network, or a cellular telephone network. The communications network 61 may further include multiple inter-connected networks and/or sub-networks that provide communications services, including voice calling and packet switched network services (e.g., Internet access, plain old telephone system (POTS) communication services, VoIP communication services) to at least one communications device 204 connected to the communications network 61.

Each communications device 204 on the communications network 61 may have its own unique device identifier which may be used to indicate, reference, or selectively connect to the particular communications device 204 on the communications network 61. For instance, a VoIP communications device 204 may be identified by a uniform resource identifier (URI), a POTS communications device 204 may be identified by a telephone number, and a tablet device may be identified by an IP address, a MAC address, or a communications user account name (e.g., a Skype username).

In some cases, a communications device 204 may be integrated with a vehicle 31. As an example, a communications device 204 may be paired with the VCS 1 of the vehicle 31 to allow the communications device 204 to utilize the human-machine interface (HMI) of the vehicle 31 in support of the communications functions of the communications device 204. For instance, a communications device 204 paired with the vehicle 31 VCS 1 may operate as a device headset (e.g., via a BLUETOOTH connection) and/or to display call or message information on a display 4 of the vehicle 31. As another example, a communications device 204 may be integrated into the vehicle 31, e.g., via onboard modem 63 having a unique device identifier assigned to the vehicle 31 itself (e.g., a phone number), to serve as its own separately-addressable endpoint to send and receive communications 202.

Each communications device 204 may be configured to maintain notification settings 208 indicative of how the communications device 204 should inform a user of the communications device 204 of an incoming communication 202. For example, the notification settings 208 may include whether or not to provide visual feedback, and if so what to display and on what displays. As another example, the notification settings 208 may include whether or not to provide haptic feedback, and if so in what pattern or intensity. As a further example, the notification settings 208 may include whether or not to provide audio feedback, and if so what sounds (e.g., what ringtone) and in what pattern (e.g., a first sound, and then a second sound, haptic feedback and then sound, etc.) or volume (e.g., at a low volume, at a high volume, at an increasing volume, etc.).

The communications device 204 may be configured to maintain multiple default notification settings 208 profiles. For instance, the communications device 204 may maintain a normal set of notification settings 208 for use when the user is in a normal setting, and a quiet set of notification settings 208 to be used in settings in which the first set of notification settings 208 may be too loud or obtrusive.

Incoming communications requests 202 may be associated with message directive information 210. The message directive information 210 may include information indicating aspects of the communication requests 202 that may affect how a recipient communications device 204 should notify the user of the incoming communication 202. As some examples, the message directive information 210 may include an indication of a priority of the incoming communication 202 (low, high, emergency, normal, etc.), a category of the communication 202 (e.g., friends, family, business, etc.), and a type of the communication 202 (e.g., text message, multimedia message, phone call, etc.), as some examples.

To allow the communications device 204 to provide different types of notification based on the properties of the incoming communication 202, the communications device 204 may be further configured to maintain notification settings 208 corresponding to various possible values of message directive information 210 that may be associated with incoming communications 202. As one possibility, the communications device 204 may be configured to maintain separate notification settings 208 for incoming communications 202 identified by message directive information 210 as being emergency communications 202, low priority communications 202, and normal priority communications 202. As another possibility, the communications device 204 may be configured to maintain separate notification settings 208 for incoming communications 202 identified by message directive information 210 as being friends, family, or business communications 202.

The communications application 212 may be configured to present a user interface to the user to allow the user to configure the notification settings 208 for the communications device 204. For example, the communications application 212 may be configured to allow the user to specify notification settings 208 corresponding to different values of message directive information 210. As a more specific example, the user may utilize the communications application 212 to set a specific ringtone to be applied to incoming communications 202 associated with an emergency priority.

The message directive information 210 may be provided to the receiving communication device 204 in various ways, such as within the negotiation, header, or body of the incoming communication 202, via a communications server 206 intermediary, or by way of a pre-communication message. Further aspects of these exemplary approaches are discussed below with respect to FIGS. 3-5.

Figure 3:
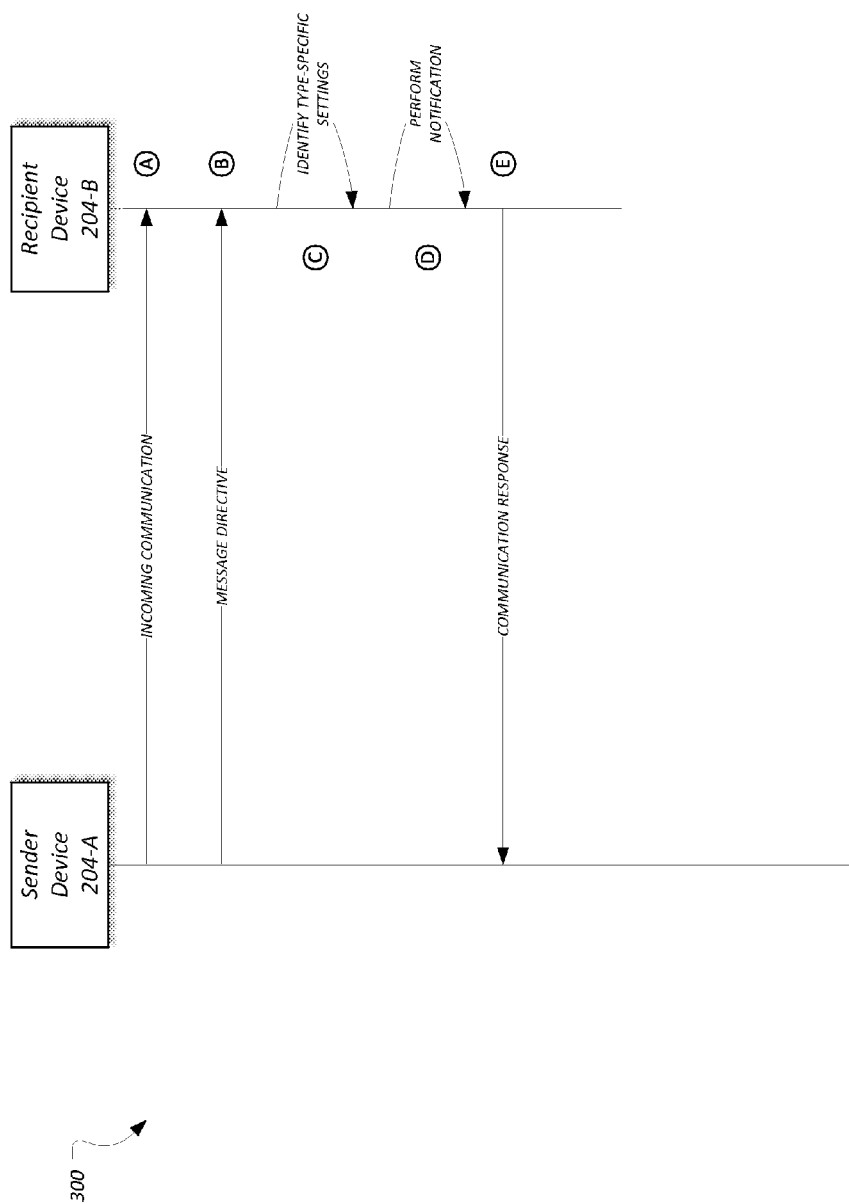
FIG. 3 illustrates an exemplary call flow for including message directive information in the incoming communication from the sender device to the recipient device.

FIG. 3 illustrates an exemplary call flow 300 for including message directive information 210 in the incoming communication 202 from the sender device 202-A to the recipient device 202-B. In the exemplary call flow 300, the incoming communication 202 may be modified to include the message directive information 210 within the negotiation, header, or body of the incoming communication 202.

More specifically, at time index (A), the sender device 204-A provides and the recipient device 204-B receives an incoming communication request 202 from the sender device 204-A. At index (B), recipient device 204-B further receives a message directive 210 from the sender device 204-A. To do so, the incoming communication 202 may be modified to include a category or type field including the message directive 210 into the negotiation, header, or body of the communication request. For instance, for an IP based communication (such as a VoIP communication 202 set up using SIP), a category may be sent or otherwise included in an encrypted packet payload sent from the sender device 204-A to the recipient device 204-B after an initial handshake. For non-IP based communication (such as POTS calls over the PSTN), the message directive 210 may be sent by the recipient device 204-B after an initial handshake as a part of ISUP SS7 signaling.

At index (C), the recipient device 204-B identifies which notification settings 208 to use to inform the user of the incoming communication 202. For example, the recipient device 204-B may identify indications of the priority, category, or type of the incoming communication 202 from the message directive 210, and may retrieve any maintained indication-specific notification settings 208 for the priority, category, or type of the message directive 210. If no indication-specific notification settings 208 for the priority, category, or type of the message directive 210 are located (or if no message directive 210 is received), then the recipient device 204-B may instead retrieve the currently active notification settings 208 (e.g., normal settings, quiet settings, silent mode, etc.).

At index (D), the recipient device 204-B performs a notification of the user in accordance with the retrieved notification settings 208. The notification may be provided, for example, using one or more of: a user interface of the recipient device 204-B, and a user interface of the VCS 1 with which the recipient device 204-B is paired. Regardless of which user interface or user interfaces are used, the recipient device 204-B may provide visual feedback, haptic feedback, and/or audio feedback in accordance with the retrieved notification settings 208.

At index (E), the recipient device 204-B optionally provides a response to the incoming communication 202. For example, if the incoming communication 202 is session-based, the recipient device 204-B may provide a response back to the sender device 204-A indicative of whether the session is accepted (e.g., whether the user picks up the phone call). As another example, if the incoming communication 202 is message-based, the recipient device 204-B may provide a response back to the sender device 204-A indicative of whether the communication 202 was viewed or otherwise accessed by the user of the recipient device 204-B (e.g., whether the SMS message was read).

Figure 4:
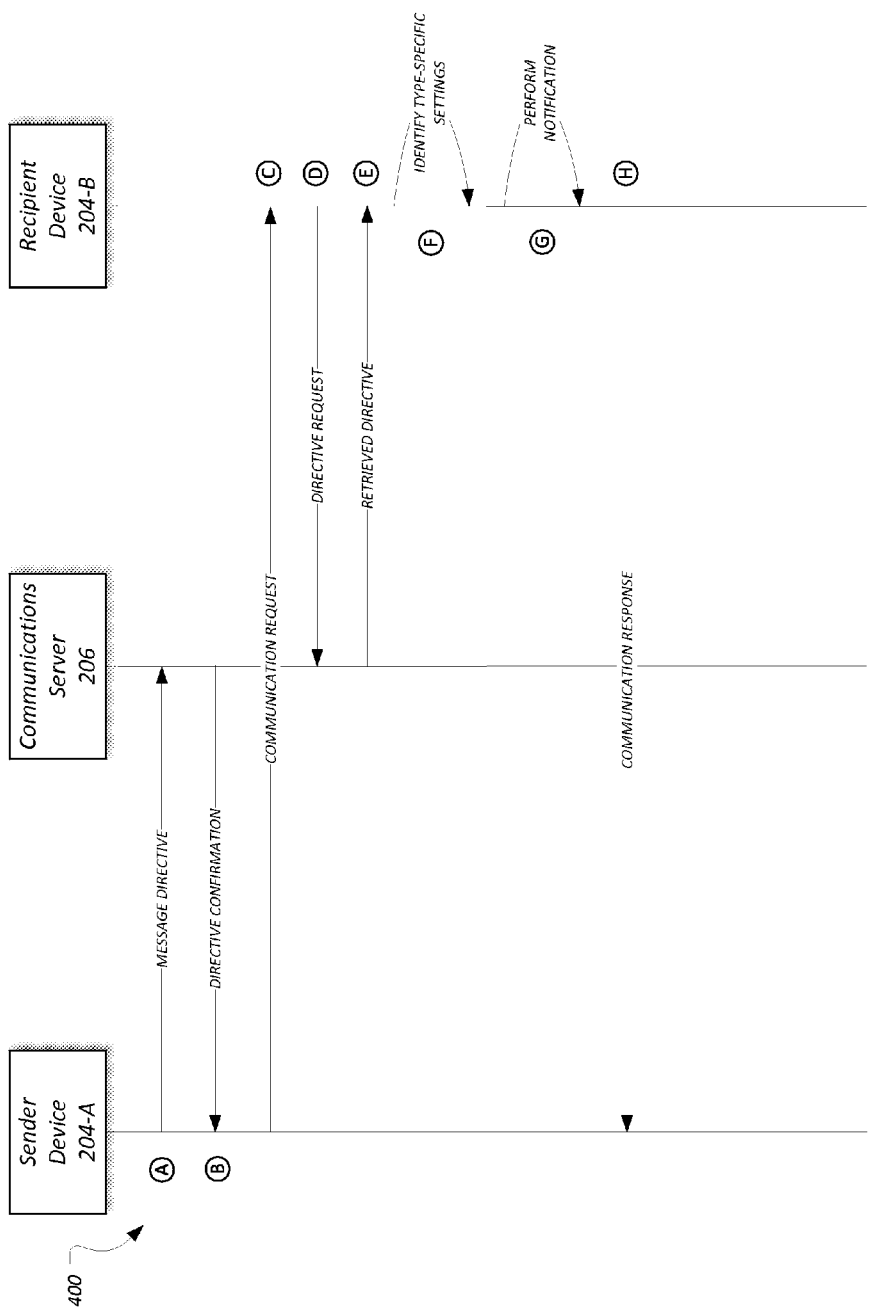
FIG. 4 illustrates an exemplary call flow for providing message directive information from the sender device to the recipient device using the communications server.

FIG. 4 illustrates an exemplary call flow 400 for providing message directive information 210 from the sender device 202-A to the recipient device 202-B using the communications server 206. In the exemplary call flow 400, the communications server 206 intermediary to the incoming communication 202 may be utilized to store and later provide the message directive information 210 to the recipient communication device 204.

At time index (A), the sender device 204-A provides the message directive 210 to the communication server 206. For example, the sender device 204-A may perform a POST request to the communication server 206 including information indicative of the originator of the communication 202 (i.e., the sender device 204-A), the destination of the communication 202 (i.e., the recipient device 202-B) and the message directive 210 information indicative of the category, type, or other attributes of the communication 202. At index (B) the communication server 206 optionally provides a directive confirmation back to the sender device 204-A. The confirmation may be used by the communication server 206, for example, to indicate that the message directive 210 is set up for later retrieval.

At index (C), the sender device 204-A provides and the recipient device 204-B receives an incoming communication 202 from the sender device 204-A. In some examples, the sender device 204-A may provide the incoming communication 202 responsive to receipt of the directive confirmation from the communication server 206. In other examples, the sender device 204-A may send the incoming communication 202 without waiting for the directive confirmation (e.g., a predetermined amount of time after), or may send the incoming communication 202 and message directive 210 substantially simultaneously.

At index (D), responsive to receipt of the incoming communication 202, the recipient device 204-B sends a directive request to the communication server 206. For example, the recipient device 204-B may send a GET request to the communication server 206 requesting for the communication server 206 to returns the message directive information 210 about the communication. To allow the communications server 206 to retrieve the associated message directive information 210, the recipient device 204-B may include information in the request such as an indication of the originator of the communication 202 (i.e., the sender device 204-A) and an indication of the destination of the communication 202 (i.e., the recipient device 202-B).

At index (E), responsive to the directive request, the communication server 206 provides the retrieved message directive information 210 to the recipient device 204-B. If communications server 206 is unable to locate matching directive information, the communications server 206 may instead revert to a default for the message directive information 210, such as an undefined or unknown message category or type.

Similar to as discussed above with respect to indexes (C), (D), and (E) of the call flow 300, in the call flow 400 at index (F), the recipient device 204-B identifies which notification settings 208 to use to inform the user of the incoming communication 202, at index (G), the recipient device 204-B performs a notification of the user in accordance with the retrieved notification settings 208, and at index (H), the recipient device 204-B optionally provides a response to the incoming communication 202.

Figure 5:
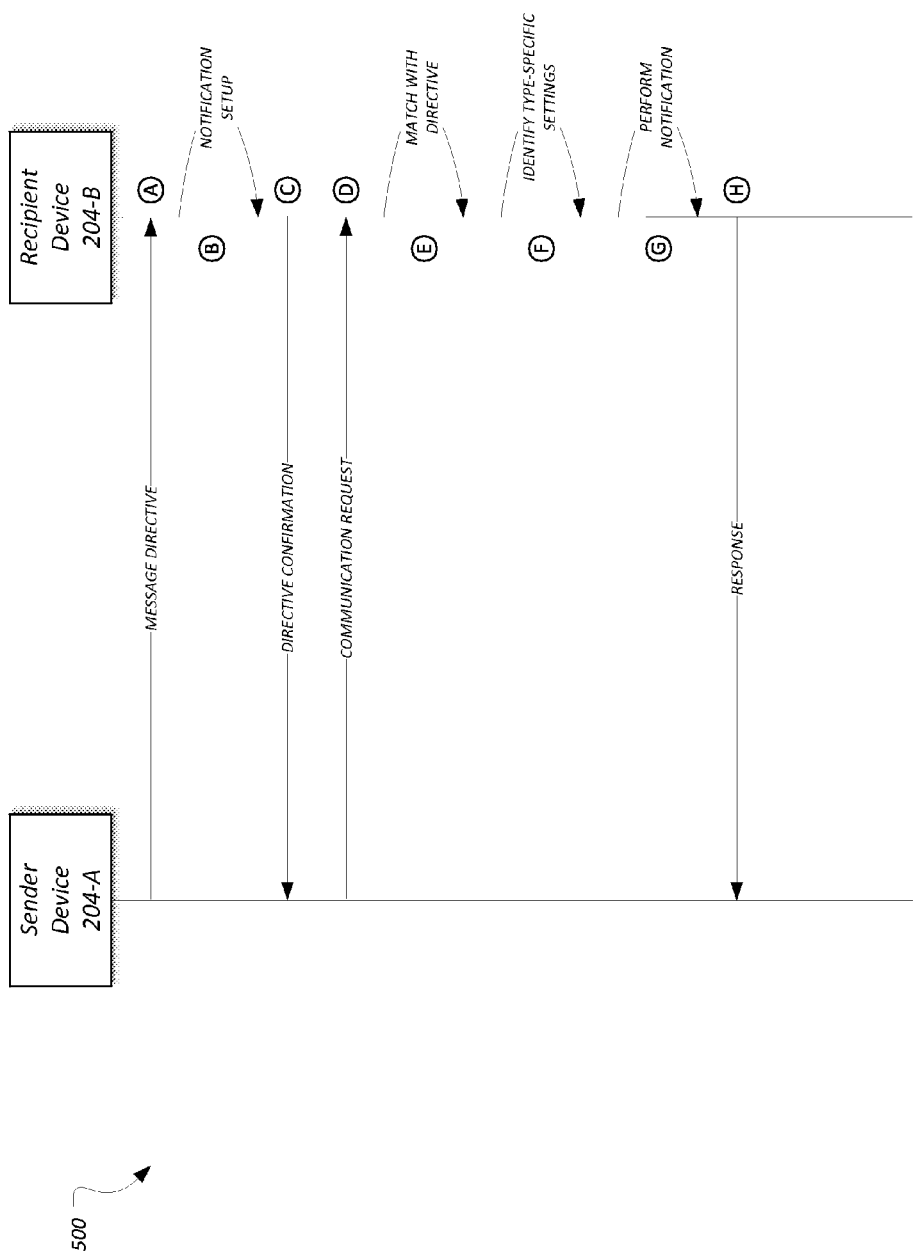
FIG. 5 illustrates an exemplary call flow for providing the message directive information from the sender device to the recipient device using a pre-communication message.

FIG. 5 illustrates an exemplary call flow 500 for providing the message directive information 210 from the sender device 202-A to the recipient device 202-B using a pre-communication message. In the exemplary call flow 500, the pre-communication message may include the message directive information 210 to be matched to a later communication from the sender communication device 204 to the recipient communication device 204.

At time index (A), the sender device 204-A provides message directive information 210 to the recipient device 204-B. The message directive information 210 may accordingly include information regarding how the recipient device 204-B should handle a subsequent incoming communication 202 to be provided by the sender device 204-A. In an example, the sender device 204-A may send the message directive information 210 in an SMS message.

At time index (B), the recipient device 204-B performs notification setup. For example, the recipient device 204-B may maintain the associated directive information 210 in association with an indication of the sender device 204-A and the current date/time at which the message directive information 210 was received. At time index (C), the recipient device 204-B may optionally be configured to provide a directive confirmation of the notification setup for the sender device 204-A to receive.

At time index (D), the sender device 204-A provides and the recipient device 204-B receives an incoming communication 202 from the sender device 204-A. In many cases in which the recipient device 204-B is configured to provide directive confirmation, the sender device 204-A may provide the incoming communication 202 responsive to receive of the directive confirmation.

At time index (E), the recipient device 204-B matches the incoming communication 202 to the message directive information 210 set up at time index (B). This matching may be performed, for example, to verify that the incoming communication 202 corresponds to the directive information 210. For example, the recipient device 204-B may ensure that the incoming communicating 202 is from the same sender device 204-A as the directive information 210. As another example, the recipient device 204-B may also ensure that the directive information 210 matching the incoming communicating 202 is less than a predetermined amount of time old. If the incoming communication 202 matches, then the incoming communication 202 may be handled according to the directive information 210. If the incoming communication 202 does not match, then the incoming communicating 202 may be handled according to the default notification settings 208.

Similar to as discussed above with respect to indexes (C), (D), and (E) of the call flow 300, at index (F) of the call flow 500, the recipient device 204-B identifies which notification settings 208 to use to inform the user of the incoming communication 202, at index (G), the recipient device 204-B performs a notification of the user in accordance with the retrieved notification settings 208, and at index (H), the recipient device 204-B optionally provides a response to the incoming communication 202.

Figure 6:
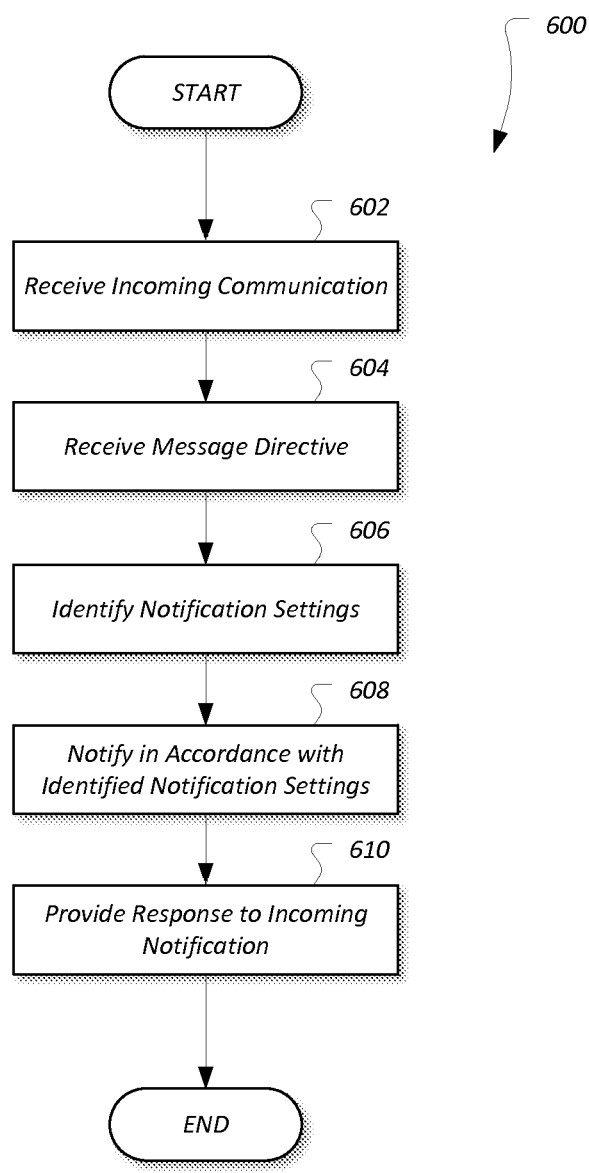
FIG. 6 illustrates an exemplary process for notifying a user of an incoming communication in accordance with received message directive information and maintained notification settings.

FIG. 6 illustrates an exemplary process 600 for notifying a user of an incoming communication 202 in accordance with received message directive information 210 and maintained notification settings 208. The process 600 may be performed for example, by the recipient communications device 204-B receiving the incoming communication request 202 over the network 61 from the sender communications device 204-A.

At operation 602, the recipient device 204-B receives the incoming communication 202. For example, the incoming communication 202 may be received as discussed in detail above with respect to each of FIGS. 3-5. At operation 604, the recipient device 204-B receives the message directive information 210. For example, the incoming communication 202 may be received as discussed in detail above with respect to each of FIGS. 3-5. It should be noted that in some cases the operations 604 may be performed before the operation 602, while in other cases the operation 604 may be performed after the operation 602, or at a substantially simultaneous time to the operation 602.

At operation 606, the recipient device 204-B identifies which notification settings 208 to use to inform the user of the incoming communication 202. For example, the recipient device 204-B may identify indications of the priority, category, or type of the incoming communication 202 from the message directive 210, and may retrieve any indication-specific notification settings 208 for the priority, category, or type of the message directive 210 maintained by the recipient device 204-B (or otherwise accessible to the recipient device 204-B via a network or otherwise). If no indication-specific notification settings 208 for the priority, category, or type of the message directive 210 are located (or if no message directive 210 is received), then the recipient device 204-B may instead retrieve the currently active notification settings 208 (e.g., normal settings, quiet settings, silent mode, etc.).

At operation 608, the recipient device 204-B notifies of the incoming communication 202. The notification may be provided, for example, using one or more of: a user interface of the recipient device 204-B, and a user interface of the VCS 1 with which the recipient device 204-B is paired. Regardless of which user interface or user interfaces are used, the recipient device 204-B may provide visual feedback, haptic feedback, and/or audio feedback in accordance with the retrieved notification settings 208.

At operation 610, the recipient device 204-B optionally provides a response to the incoming communication 202. For example, if the incoming communication 202 is session-based, the recipient device 204-B may provide a response back to the sender device 204-A indicative of whether the session is accepted (e.g., whether the user picks up the phone call). As another example, if the incoming communication 202 is message-based, the recipient device 204-B may provide a response back to the sender device 204-A indicative of whether the communication 202 was viewed or otherwise accessed by the user of the recipient device 204-B B (e.g., whether the SMS message was read). After operation 610, the process 600 ends.

In general, computing systems and/or devices, such as the VCS 1, communications devices 204 and communications service 206, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the VCS 1, communications devices 204 and communications service 206 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the database 118, may include various kinds of mechanisms for storing, accessing, and retrieving various kinds of data, including a hierarchical database, a set of files in a file system, an application database in a proprietary format, a relational database management system (RD-BMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a recipient communications device, associated with a vehicle computing system (VCS), configured to:
receive, over a communications network, an incoming communication and a message directive specific to the incoming communication indicating a notification type, each provided in separate messages from a sender communications device,
retrieve notification settings associated with the notification type responsive to the message directive being less than a predetermined amount of time old, and
perform a notification of receipt of the incoming communication using a VCS user interface according to the notification settings.

2. The system of claim 1, wherein the recipient communications device includes one of a nomadic device paired with the vehicle computing system and a modem embedded within the vehicle computing system.

3. The system of claim 1, wherein the notification settings include information regarding at least one of: (i) visual feedback to provide for communications of the notification type, (ii) haptic feedback to provide for communications of the notification type, and (iii) audio feedback to provide for communications of the notification type.

4. The system of claim 1, wherein the recipient communications device is further configured to:

send a directive request to a communications server in response to receipt of the incoming communication by the recipient communications device; and
receive the message directive from the communications server in response to the directive request, the message directive being received from the sender communications device by the communications server.

5. The system of claim 1, wherein the recipient device is further configured to:
receive the message directive, prior to receipt of the incoming communication from the sender device, in a message from the sender device,
match the message directive to the incoming communication, responsive to receipt of the incoming communication by the recipient device, and
identify the notification to provide from the message directive when the message directive matches the incoming communication.

6. A method comprising:
receiving, by a recipient communications device over a communications network, an incoming communication and a message directive specific to the incoming communication indicating a notification type, each provided in separate messages from a sender communications device;
identifying, by the recipient communications device, a notification type to provide based on the message directive responsive to determining that the message directive is less than a predetermined amount of time old;
retrieving notification settings associated with the notification type; and
performing a notification of receipt of the incoming communication in accordance with the notification settings.

7. The method of claim 6, further comprising at least one of: (i) performing the notification using a user interface of the recipient communications device, and (ii) performing the notification using a user interface of a vehicle computing system with which the recipient communications device is paired.

8. The method of claim 6, wherein the notification settings include information regarding at least one of: (i) visual feedback to provide for communications of the notification type, (ii) haptic feedback to provide for communications of the notification type, and (iii) audio feedback to provide for communications of the notification type.

9. The method of claim 6, further comprising:
send a directive request to a communications server in response to receipt of the incoming communication by the recipient communications device; and
receive the message directive from the communications server in response to the directive request, the message directive being received from the sender communications device by the communications server.

10. The method of claim 6, further comprising:
receiving the message directive, prior to receipt of the incoming communication from the sender device, in a message from the sender device;
matching the message directive to the incoming communication, responsive to receipt of the incoming communication by the recipient device; and
identifying the notification to provide from the message directive when the message directive matches the incoming communication.

11. A non-transitory computer-readable medium including instructions that when executed by a recipient communications device cause the recipient communications device to:
  receive, over a communications network, an incoming communication and a message directive specific to the incoming communication indicating a notification type, each provided in separate messages from a sender communications device;
  identify the notification type to provide based on the message directive responsive to determining that the message directive is less than a predetermined amount of time old;
  retrieve notification settings associated with the notification type; and
  perform a notification of receipt of the incoming communication in accordance with the notification settings.

12. The medium of claim 11, further including instructions to cause the recipient communications device to at least one of: (i) perform the notification using a user interface of the recipient communications device, and (ii) perform the notification using a user interface of a vehicle computing system with which the recipient communications device is paired.

13. The medium of claim 11, wherein the notification settings include information regarding at least one of: (i) visual feedback to provide for communications of the notification type, (ii) haptic feedback to provide for communications of the notification type, and (iii) audio feedback to provide for communications of the notification type.

14. The medium of claim 11, further including instructions to cause the recipient communications device to:
  send a directive request to a communications server in response to receipt of the incoming communication by the recipient communications device; and
  receive the message directive from the communications server in response to the directive request, the message directive being received from the sender communications device by the communications server.

15. The medium of claim 11, further including instructions to cause the recipient communications device to:
  receive the message directive, prior to receipt of the incoming communication from the sender device, in a message from the sender device,
  match the message directive to the incoming communication, responsive to receipt of the incoming communication by the recipient device, and
  identify the notification to provide from the message directive when the message directive matches the incoming communication.

16. The system of claim 1, wherein the recipient communications device is further configured to identify an unknown notification type to the incoming communication when the optional message directive is not received.

17. A method comprising:
  receiving, over a communications network in separate messages, an incoming communication and a message directive indicating a notification type;
  when the message directive is less than a predetermined amount of time old, retrieving notification settings associated with the notification type and otherwise retrieving default notification settings; and
  performing a notification of receipt of the incoming communication using a vehicle user interface according to the retrieved notification settings.

* * * * *